C. D. Wheeler.
Needle Case & Index.
No. 1064. Reissued Oct. 16. 1860
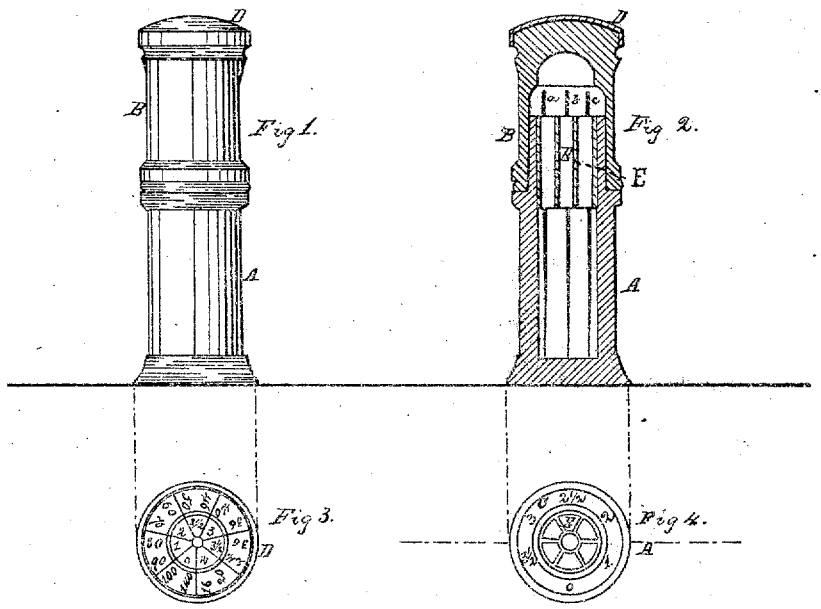
Witnesses
E. A. Dirgin
D. G. Rowlands
Inventor
C. D. Wheeler

UNITED STATES PATENT OFFICE.

CALVIN D. WHEELER, OF BRIDGEPORT, CONNECTICUT.

IMPROVED NEEDLE CASE AND INDEX.

Specification forming part of Letters Patent No. 24,070, dated May 17, 1859; Reissue No. 1,064, dated October 16, 1860.

*To all whom it may concern:*

Be it known that I, CALVIN D. WHEELER, of Bridgeport, in the county of Fairfield and State of Connecticut, have invented a new and Improved Needle-Case and Index for Sewing-Needles; and I do hereby declare the following to be a full, clear, and exact description thereof, reference being had to the accompanying drawings, figures, and letters of reference thereon, making part of this specification.

Of the said drawings, Figure 1 is a view of the case as closed. Fig. 2 is a vertical section. Fig. 3 is a top view showing the index for the appropriate sizes of the needles and thread which properly work together. Fig. 4 shows the cells for the needles, (the cover being removed,) with the surrounding ring of figures describing the sizes of needles thereof, except the central cell, which is designed for the largest-size needles, and from its position cannot well be numbered.

Similar letters of reference indicate like parts in all the drawings.

For the convenience of sewing by machinery or hand it is essential to provide a proper receptacle for holding the needles, protecting them from injury, and describing the sizes, thereby enabling a person to at once select the desired needle for the work.

In the operating of sewing-machines by persons unskilled much difficulty is experienced in not properly adapting the sizes of threads and needles so that their proper action may not be impaired in puncturing the material and drawing up the stitch.

To this end my invention consists in providing a case for holding and protecting the needles in cells or compartments, the respective sizes thereof being designated on the case by figures, letters, or other devices, and also in arranging and combining with the case an index designating the appropriate sizes of needles and threads to properly work together in sewing.

To enable others skilled in the art to make and use my invention, I will proceed to describe its construction and operation.

A represents the shell of the case, which contains the numbered cells E for the needles, as shown in Figs. 2 and 4, the largest or No. 4 needle being placed in the central division of the case, which corresponds to division No 4 on the cover. B is the cap or cover, which fits the shell of the case sufficiently tight to maintain its position thereon. C shows the surrounding ring of figures or devices placed opposite the cells to indicate the size of needles, except that of the central division of the case, which, from its construction, cannot well be numbered, but is designed for the largest needle, as shown in Fig. 4.

D is a plate or cover, secured by friction or otherwise to the main cover, or may be stamped upon the cover, and is provided with the sizes of needles to correspond with those on the shell of the case at C, No. 4 corresponding with the central division in the case, and directly opposite will be seen the numbers which designate the appropriate-sized threads for the size of needles, as seen in Fig. 3.

The needles in the case are represented by the heavy black lines *a b c*, Fig. 2.

The index-cover is designed as a universal index, irrespective of its position on the case. For example, the operator desires fine sewing, and by a glance at the index-cover (the inner circle describing the size of needles and the outer the threads) opposite of figure 1 for the needle will be seen 80 and 90 thread, which will properly work with a No. 1 needle, as desired. Removing the cover, the figure 1 on the surrounding ring designates the cell, from which a needle is taken and the case laid aside for future use.

It will be obvious to every one that my improved needle case forms a valuable and useful article of sewing by machinery or hand, avoiding the time and trouble consumed in experiments to obtain a result which is always shown and determined.

I am aware that pencil boxes having a hinged lid constructed with partitions, and having letters to indicate the contents, are well known, and I therefore make no broad claim to such; but

I claim—

1. A cylindrical case constructed with cells, substantially such as described, for containing the needles, and combining therewith an index of letters or figures for designating the size of the needles, substantially as and for the purposes set forth and specified.

2. Arranging the cover or some convenient part of said case with an index which shall designate the appropriate sizes of thread and needles to properly work together, as set forth.

CALVIN D. WHEELER. [L. S.]

Witnesses:
F. HURD,
G. W. BACON.